United States Patent [19]
Winters

[11] 3,874,175
[45] Apr. 1, 1975

[54] APPARATUS FOR CONTAINING WASTE MATERIALS

[75] Inventor: Raymond S. Winters, LaGrange, Ill.

[73] Assignee: Environetics, Inc., Worth, Ill.

[22] Filed: Sept. 5, 1972

[21] Appl. No.: 286,566

[52] U.S. Cl............................. 61/.5, 61/1 R, 61/35, 220/26 R, 220/85 A
[51] Int. Cl........................... B65g 5/00, C02c 3/00
[58] Field of Search .............. 61/35, .5, 1 R; 52/63, 52/169; 220/26 R, 85 A; 210/170, 513; 23/259.1; 71/8, 9, 10

[56] References Cited
UNITED STATES PATENTS

| | | | |
|---|---|---|---|
| 2,211,958 | 8/1940 | Mahaffey | 61/.5 X |
| 2,989,379 | 6/1961 | Gilberton | 23/259.1 |
| 3,330,118 | 7/1967 | Biais | 61/.5 |
| 3,537,267 | 11/1970 | Webb | 61/.5 R |
| 3,592,009 | 7/1971 | Glijnis | 61/.5 |
| 3,724,664 | 4/1973 | Lemberger et al. | 210/170 |
| 3,736,754 | 6/1973 | Azalbert et al. | 61/.5 |

Primary Examiner—Paul R. Gilliam
Assistant Examiner—Alex Grosz
Attorney, Agent, or Firm—Hume, Clement, Brinks, Willian, Olds & Cook, Ltd.

[57] ABSTRACT

A unique waste materials containment apparatus is provided for use in collecting and containing waste materials, such as livestock and animal waste. The apparatus includes a pit area that is typically lined with a resistant, liquid imprevious membrane, a floating cover assembly which covers the pit area and at the same time provides a unique gas inlet trap at the pit area inlet, an assembly to secure the pit liner and cover and a waste materials removal system, and in some instances agitation system, for maintaining the waste materials in a slurry condition and for removing the materials from the pit area.

A method is also provided for collecting and containing waste materials in a covered pit area and utilizing the cooling effect of water evaporating from the cover surface to reduce the waste material temperature and discourage the growth of odor producing micro-organisms.

16 Claims, 5 Drawing Figures

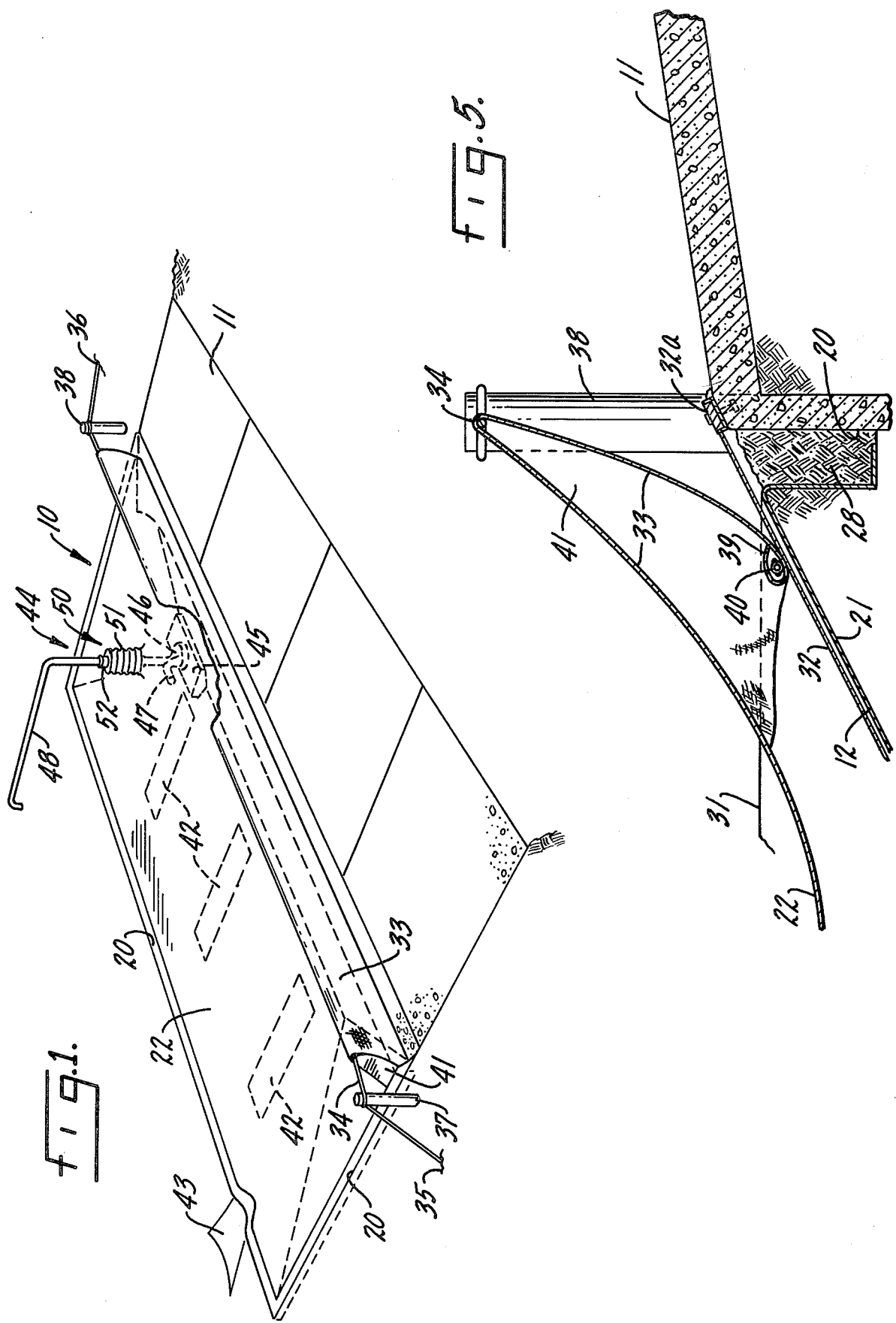

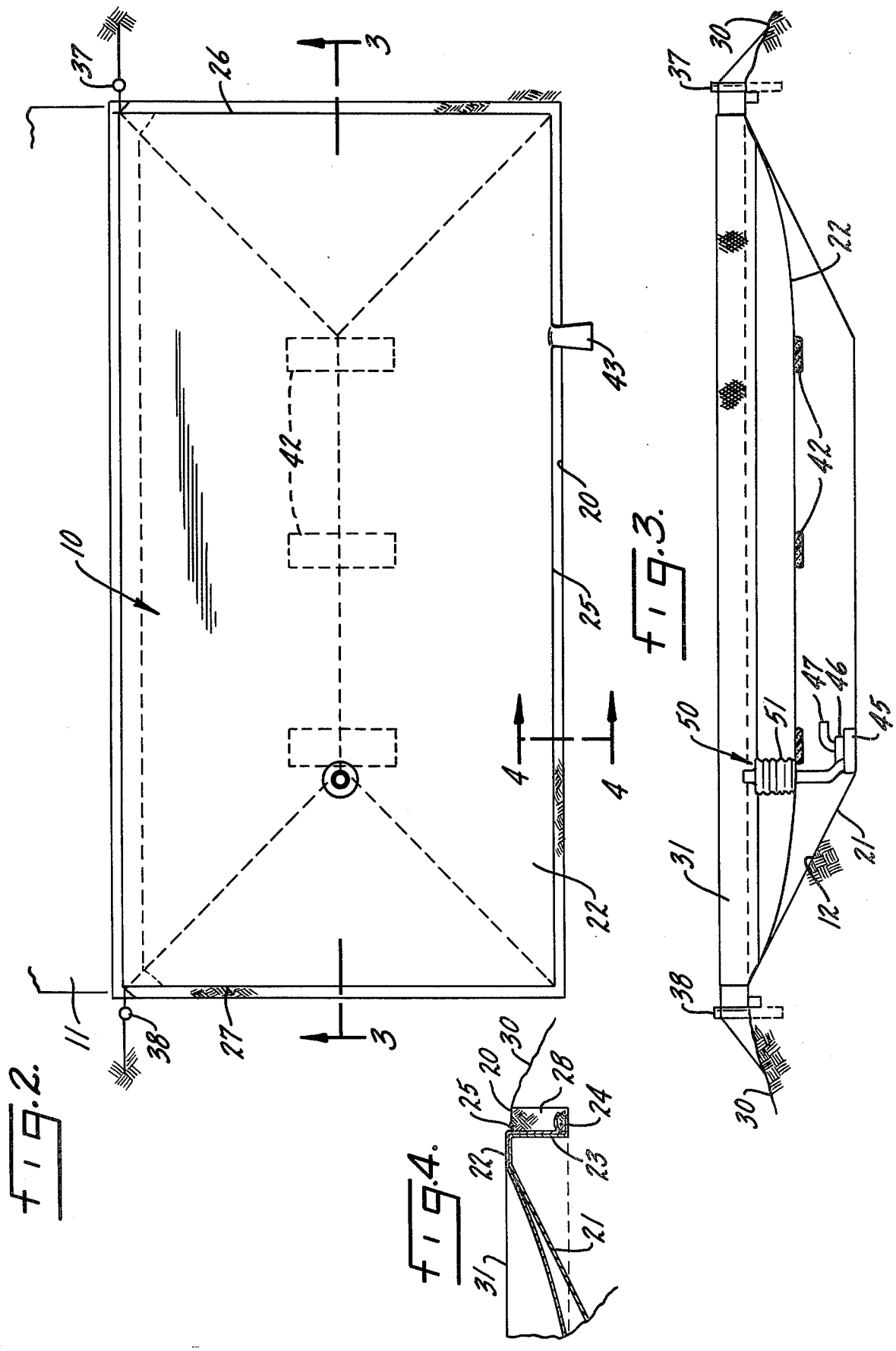

APPARATUS FOR CONTAINING WASTE MATERIALS

BACKGROUND OF THE INVENTION

This invention relates generally to a method and apparatus for containing waste materials, and specifically, to a method and apparatus for reducing the pollution capability of animal and livestock waste through the low cost and efficient containment of such waste.

It has become known that areas of livestock concentration, such as feedlots and barnyards, are the direct cause of serious and ever increasing environmental problems. Animal waste materials generated in such areas, for example, not only contribute significantly to the pollution of streams and underground water supplies, but, in addition, produce noxious and undesirable odors that reduce livestock efficiency and are objectionable to humans. Moreover, the magnitude of the problem increases as the demand for meat and related animal products increases. The average cow, for example, produces ten times the waste of a human and a feeder hog nearly three times that of a human. In addition, such livestock waste has a high B.O.D. (biological oxygen demand) and high suspended solids content, and is, therefore, especially difficult to treat once it has been permitted to become a pollutant material in fresh water supplies.

Prior to the enactment of more stringent water and air pollution codes, it was not unusual for farmers to avoid the problem simply by locating livestock feeding areas down-wind of their immediate living areas and at high points where waste materials would not directly contaminate existing fresh water wells. Nonetheless, such feedlot waste was still dispersed into other fresh water resources, either through surface run-off directly into lakes, rivers and streams or through seepage into the porous soil that is usually found in feedlot areas and ultimately from the porous soil into underground water reserves.

With the enactment of more demanding air and water pollution legislation, however, initial measures, such as the construction of large, expensive, open lagoons, holding facilities and settling basins, have been taken in the larger feedlots in an attempt to solve the waste pollution problem. Such initial measures, however, have proven to be far too costly for owners of smaller feedlots, and inadequate to fully meet all the pollution problems of even the largest feedlot owners. On the one hand, such lagoons, holding facilities and settling tanks are expensive because of the basic steel and concrete construction materials used for such facilities, and also because of the expensive treatment and removal equipment needed to efficiently operate such facilities. On the other hand, such facilities have proven to be inadequate because they are open to the air and, therefore, result in (1) large quantities of airborne waste contaminants from diseased animals that infect other animals, and (2) the development of undesirable and noxious odors in the general area of the waste recovery facility. This latter deficiency, e.g., odor pollution, has become particularly important since the advent of large confinement feeding installations in which animals are kept in a highly controlled environment in facilities located near large urban areas.

As a consequence of the increased demand for meat and related animal products, the resultant increase in livestock waste and pollution potential, and the highly expensive and relatively inefficient existing waste recovery systems, an urgent need has developed for low cost and efficient waste containment systems and apparatus that are compatible with existing livestock feeding facilities and yet are effective in containing livestock waste pollution.

SUMMARY OF THE INVENTION

According to this invention, a low cost, but effective, waste material containment means is provided for use in collecting and containing waste materials. The waste material containment means generally includes: means for defining a pit area for containing liquid and solid waste materials having an inlet section that is adapted to receive such materials; cover means associated with and covering the pit area, a portion of which acts in conjunction with the inlet section of the pit area to freely permit the passage of waste materials into the pit area, but to restrain escape of gases from the pit area; means to secure the cover means above the pit area and to suspend at least that portion of the cover means that acts in conjunction with the inlet section of the pit area above the pit area; and removal means to remove waste material from the pit area.

According to the method of this invention, waste material is collected and contained in a covered waste material collection means, the material is held for a time and at a temperature sufficient to inhibit the generation of odor producing micro-organisms, the material is agitated to maintain it in a slurry condition, and the material is removed from the covered waste material collection means for further treatment or disposal.

BRIEF DESCRIPTION OF THE DRAWINGS

The method and apparatus of this invention will be better understood through reference to the accompanying drawings in which:

FIG. 1 is a perspective view of one of the embodiments of the invention showing a typical feedlot area and adjacent lined pit and cover means for containing livestock waste;

FIG. 2 is a top plan view of the waste containment apparatus illustrated in FIG. 1 further illustrating the cover and cover floation means for the apparatus;

FIG. 3 is a cross-sectional view of the waste containment apparatus shown in FIG. 2 taken across 3—3 and further illustrating the pit liner and cover assembly;

FIG. 4 is a cross-sectional view taken across 4—4 of FIG. 2 and further illustrating an anchor trench around the pit perimeter being used to secure the pit liner and cover; and FIG. 5 is a side cross-sectional view of waste containment apparatus inlet, showing suspension means for the pit cover and an inlet trap for preventing the escape of noxious odors.

DETAILED DESCRIPTION OF THE DRAWINGS

The waste containment means of this invention generally comprises a sloped-walled pit area, which is desirably, although not necessarily, lined with a strong, inert, but relatively lowcost synthetic membrane, a floating cover means associated with the pit and typically having a suspended inlet assembly capable of freely permitting the entry of liquid and solid waste, but restricting the passage of noxious gases from inside the pit, and a waste agitation and pumping means capable of agitating the slurry of waste materials contained in the pit area from time to time and of removing such materials when desired.

As illustrated in FIG. 1, one of the unique features of the waste containment means of the present invention is that it is compatible with and can be constructed directly adjacent an existing feedlot or barnyard facility. One embodiment of the waste containment means of this invention is shown generally at 10 in FIG. 1. For purposes of illustration, waste containment means 10 is shown in a position directly adjacent the sloped floor 11 of a feedlot. As shown generally in FIG. 1, and more specifically in FIGS. 4 and 5, the sloped-walled pit area 12 is surrounded by an anchor trench 20 which is dug around the pit perimeter. As shown in FIGS. 4 and 5, the anchor trench 20 is used as a securing means to firmly secure pit liner 21 and three edges of cover means 22 in place. When a pit liner 21 is used in the practice of this invention, for example, it is first evenly spread throughout the pit area 12 until all four of its outer edges 23 are placed inside anchor trench 20. Typically, mounds of dirt 24 or other securing means are then placed on top of outer edges 23 at various points along the periphery of the anchor trench 20 in order to firmly secure the pit liner 21 inside the anchor trench. Again, as shown in FIG. 4, cover means 22 is spread throughout pit area 12 directly above pit liner 21. Outer edges 25, 26 and 27 of cover means 22, as is the case for pit liner edges 23, are extended into anchor trench 20, placed overtop of pit liner edges 23, and secured in place by means of back-fill 28. In this manner, all four outer edges 23 of the pit liner are secured in anchor trench 20 as are the three outer edges 25, 26 and 27 of the cover means.

The anchor trench 20 is dug to a sufficient depth and width so that backfill 28 will hold the pit liner and cover means firmly in place. It has been determined that a trench having a depth of about 1 to 2 feet and a width of 4 to 12 inches is generally sufficient to meet this objective, although larger trenches can be employed as the pit area size is increased.

As mentioned above, the waste containment means of this invention need not use pit liner 21, especially when the soil conditions in the pit area 12 are such that the soil itself is hard and nonporous. In such instances, waste containment means 10 can be constructed with only cover means 22 being used. It is preferred in the practice of this invention, however, that the pit area 12 be covered with a pit liner. It has been determined, for example, that the use of a pit liner gives complete assurance against waste seepage into surrounding soil. In addition, the use of a pit liner provides a slippery surface for the waste materials, improves the ability of waste to flow freely into the waste containment means, and simplifies waste removal, since it eliminates the chances of loose soil and other foreign objects blocking waste removal equipment.

Preferably, pit liner 21 is constructed from a strong, inert synthetic membrane, such as a thermoplastic. Although a number of materials can be used for such pit liners, it has been determined that at a minimum the liner material must resist acids, alkalis, salts, fungi and soil and waste micro-organisms; and, in addition, should be strong and durable, should be liquid impervious, should be effective at low temperatures and should have effective elongation, tear strength and cold crack characteristics. One especially preferred pit liner material is a polyvinyl chloride having the following mechanical properties:

TABLE I

| | PROPERTIES OF PIT LINER MATERIAL | |
|---|---|---|
| | Physical Values | Test Methods |
| Specific Gravity | 1.24 | ASTM D-792-66 |
| Graves Tear | MD 325 lb./in. | ASTM D-1004 |
| Graves Tear | TD 325 lb./in. | ASTM D-1004 |
| Dimensional Stability | MD 5% | ASTM D1204-54 |
| Dimensional Stability | TD 5% | ASTM D1204-54 |
| Tensile Strength | MD 2600 lb./in. | ASTM D882-56T |
| Tensile Strength | TD 2700 lb./in. | ASTM D882-56T |
| Elongation | MD 375% | ASTM D882-56T |
| Elongation | TD 375% | ASTM D882-56T |
| Cold Crack Temp. | −20°F. | CS 192-53 Sec. 49 |
| Outdoor Exposure | 1500 Sun Hours min. | |
| Volatility | .7% | ASTM D-1203 |
| Water Extraction | .35% Weight Loss | ASTM D-1239 |

It has also been determined that an acceptable thickness for pit liner 21 (assuming that the liner material has the above-listed properties) is about 10 to 30 mils.

As shown in FIGS. 3 and 4, the dirt areas 30 immediately adjacent the pit area perimeter 31 are sloped away from the pit area. This type of drop-back grading for dirt areas 30 is desirable so that surface water from the surrounding land area cannot wash into pit area 12 and carry organic soil micro-organisms either onto cover means 22 or into pit area 12.

One example of a suitable inlet portion for cover means 22 is shown specifically in FIG. 5. Pit liner 21 is shown in FIG. 5 in its secured position in anchor trench 20 being held in place by back-fill 28. Inlet apron 32 is secured to sloped feedlot floor 11 by means of bracket assembly 32a. As shown in FIG. 5, inlet apron 32 extends into pit area 12 along the side of pit liner 21. This inlet apron serves two purposes: it prevents erosion of the anchor trench 20 by waste materials flowing into the pit area, and it provides a liquid impervious junction between the feedlot floor 11 and pit liner 21.

As shown in FIGS. 1 and 5, the leading outer edge of cover means 22 can be formed into a unique gas inlet trap that prevents the escape of noxious gases from pit area 12, but at the same time freely permits the entry of waste materials into the pit area. Specifically, leading outer edge 33 of cover means 22 is suspended along the entire length of waste containment means inlet by means of a suspension cable 34. Cable 34 in turn is secured at its opposite ends 35 and 36 to the dirt area adjacent pit area 12 and is suspended across the width of the waste containment means inlet by posts 37 and 38, disposed at opposite ends of the inlet. The leading outer edge 33 of cover means 22 is draped over suspension cable 34 as shown in FIG. 5 and terminates in a sealed loop 39 that rests along the width of inlet apron 32.

In order to assure that the leading outer edge 33 of cover means 22 provides a gas tight seal for the pit area 12, a weighting means such as chain 40 is disposed inside loop 39 and extends along the length of the waste containment means inlet. In this manner, waste material can be made to flow down the sloped feedlot floor 11, onto inlet apron 32 and into pit area 12. As waste material flows into the area, either by gravity flow or force feeding, the loosely draped leading outer edge 33 of cover means 22 is lifted to permit the entry of waste material into the pit area. At the same time, the weighted loop 39 of the cover means 22 returns to its original position and precludes the undesirable escape of noxious gases from the pit area.

A closure panel 41, as shown in FIG. 1, is also provided on opposite sides of cover means 22 to provide further protection against the escape of noxious gases from pit area 12.

Cover means 22, shown specifically in FIGS. 1 and 2, is provided with a series of floatation means 42 secured thereto, which provide a self-supporting buoyant effect to the cover means. In the embodiment illustrated in FIGS. 1 and 2, floatation means 42 comprises a series of buoyant pillows that are secured by a mechanical or heat seal to the inside surface of cover means 22. Typically, the hollow buoyant pillows are filled with a buoyant material such as pelletized polystyrene. A sufficient number of such floatation means 42 are placed along the inside surface of cover means 22 to make it completely buoyant and to permit it to float on the surface of the waste material accumulated in the pit area 12.

Cover means 22, of course, serves a number of very useful and highly desirable purposes in the practice of this invention. Specifically, cover means 22 eliminates the noxious and highly undesirable odors which have become an almost traditional part of waste recovery and treatment facilities. In addition, however, the use of a cover means eliminates the problem of airborne contamination and infection of healthy animals from airborne micro-organisms resulting from the waste materials of diseased animals. Moreover, it is intended that rain water collect on the surface of cover means 22 to form a fresh water reservoir useful, for example, for fire protection, and as a source of water for cleaning the livestock area. As shown in FIG. 1, an overflow flap 43 is provided on cover means 22 to allow excess surface water collected on the cover means to be automatically removed.

Since useful gases are being collected under cover means 22 and in the pit area, the cover means serves the additional purpose of providing a potential source of fuel. Cover means 22 also serves to maintain waste material collected in pit area 12 in an easily removed slurry condition. It has been found, for example, that the surface waste in open waste collection systems such as waste lagoons, become dry over short periods of time from liquid evaporation and as a consequence, a solid crust or layer is formed that must be broken-down, chipped or liqified before removal. Use of a cover means, however, prevents the undesirable crusting of waste material and greatly simplifies the materials handling problems associated with waste material treatment and removal.

It is further intended that the natural cooling effect resulting from evaporation of surface water collected on the cover means 22, will reduce the temperature of waste material collected and contained in pit area 12. The advantage of such cooling, of course, is that the level of the waste material micro-organisms that produce noxious gases is greatly reduced when the waste material temperatures are lowered. Thus, through use of the cover means 22, contained waste material temperatures are lowered, and the level of objectionable micro-organisms is reduced. Accordingly, it is desirable in some parts of the country where rainfall levels are low to actually maintain a level of water on cover means 22 to assure liquid evaporation.

Although a number of suitable materials have been found for cover means 22, it has been determined that a fabric reinforced synthetic membrane, such as nylon reinforced polyvinyl chloride, is especially useful in the practice of this invention. Generally, the material used for cover means 22 should have the same acid, alkali and micro-organism resistant properties as the material used for pit liner 21, but in addition, should have somewhat better tensile properties in order to adequately support the weight of collected fresh water without failure. Although the thickness of the cover material is dependent on the properties of the material used, it has been found that 10 to 18 oz./yd.$^2$ nylon or polyester reinforced polyvinyl chloride sheet material (10 to 30 mils thick) is sufficient.

After the waste material is collected and contained in pit area 12, it is, of course, desirable to remove it from the pit area from time to time. It has been observed that the typical waste materials accumulated in pit area 12 are about 75 to 85 percent by weight liquid with the remaining portion being made up of floating solids and settling solids. As noted above, a portion of the waste material solids float to the top of the liquid contained in pit area 12, while another portion settles to the bottom of the pit area. The liquid layer, of course, assumes a position between the upper and lower solid layers.

It has been found desirable, therfore, to maintain the waste materials collected in pit area 12 in a homogeneous slurry condition so that upon removal both solids and liquids are removed from the pit area. In order to assure such slurry conditions, the embodiment of this invention illustrated in FIG. 1 is equipped with a permanently installed agitation and pumping means 44. Although a number of agitation and pumping means would be suitable in the practice of this invention, the agitation and pumping means 44, shown in FIG. 1, contains a pumping assembly 45 and a two-way valve 46. Two-way valve 46, in turn, is connected to a recirculation line 47 which recirculates waste material back into pit area 12 to maintain agitated conditions and an outlet line 48 that is used to remove the agitated slurry of waste material from pit area 12. Outlet line 48 can be connected to a tank wagon, which is adapted to collect waste material removed from pit area 12 and transport it to treatment facilities or to the farmer's fields for use as fertilizer material. When used in this latter fashion, the waste material collected by the waste containment means of this invention, reduces the farmer's need for purchased fertilizer.

As shown specifically in FIG. 1, outlet line 48 projects through the surface of cover means 22 and, accordingly, should desirably be sealed by means of flexible connection boot 50 or the like. Since cover means 22 moves upward and downward, depending upon the level of waste material contained in pit area 12, excess cover material 51 is disposed in a surrounding relationship with outlet line 48 and is secured to line 48 by means of clamp 52, located above the surface of the high water point for the cover means 22. This, of course, prevents surface water seepage into the pit area 12.

It should be understood that the illustrated agitation and pumping means 44 is only one of a number of agitation and removal systems that can be used in the practice of this invention. For example, a vacuum line can be placed beneath sealed loop 39 and into the pit area 12 in order to remove waste material by vacuum.

Alternatively, either temporary or permanent waste removal and agitation lines can be placed around the base perimeter of pit area 12. In either event, however, the flexible connection boot 50 is not required when such removal and agitation lines are placed around the pit area perimeter or at the waste containment means inlet.

As an alternative to locating the pit area 12 directly adjacent an existing feedlot or confinement area, the pit area can be located in any area away from the confinement area 11 and inlet lines can be run above or below ground directly to the waste containment means. In such situations, the inlet line is run directly into the pit area 12 at some point below cover means 22.

Although virtually any size pit area 12 can be used in the practice of this invention, it has been observed that a pit depth of about 6 to 8 feet is especially desirable. In addition, since ice may tend to accumulate on the cover means 22 in cold climates, it is further preferred to have the sloped-walls of pit area 12 sloped at a ratio of 2 feet of slope for every 1 foot of height. This particular angle has been found to be particularly desirable in preventing tearing of cover means 22 by the ice formed on the cover means. In other words, at a slope of 2 to 1 or less, the ice formed on the cover means tends to move up the sloped walls of pit area 12 rather than tearing cover means 22.

It should be noted that the unique waste containment means of this invention offers a number of heretofore unrealized advantages. It eliminates livestock waste material pollution by containing and collecting potential pollutants. It can be easily assembled without a skilled labor force and is relatively inexpensive in comparison to steel or concrete lagoons and the like. It can be easily constructed near existing feedlot or barnyard facilities or, if desirable, in the least significant and useful land area available. In addition, the waste containment means of this invention can, by collecting waste material, provide a useful and low-cost fertilizer source for farmers and feedlot owners, and reduce the need for purchased fertilizers. Moreover, since the waste material containment means of this invention collects and contains waste material, it further provides an excellent holding and treatment tank. For example, biological micro-organisms or chemical agents can be injected into the waste containment means in order to treat or break-down the waste material into a less objectionable or perhaps useful form.

The waste material containment means of this invention can also be used in conjunction with the method of this invention as an intermediate buffer or hold-tank. In open waste collection systems, for example, rain water or sudden surges in the level of waste material have a tendency to over or underload existing treatment facilities. Thus, through the use of the covered waste material containment means of this invention, rain water and other dilutants which would overload existing treating facilities are kept out of the waste material. In addition, the waste containment means provide a buffer zone in which the amount of waste material sent to a treating facility can be closely regulated, less being sent at peak periods and more being sent at slack periods. It should also be noted that the use of the waste containment means of this invention permits waste material to be concentrated, through partial liquid removal, to make it more easily treated by existing treatment facilities.

Both the cover means 22 and pit liner 21 are fabricated in a one piece construction typically from 4 feet wide strips of material that are bonded together by mechanical or heat sealing techniques. A further advantage of the synthetic membrane materials used in the practice of this invention is that they can be readily sealed and fabricated into a one-piece structure.

The method of this invention involves the steps of collecting and containing of waste materials in a covered waste material collection means, holding the waste materials for a time and at a temperature sufficient to cool the waste materials to a level below that at which large quantities of odor producing micro-organisms are generated (typically at least below 120°F.), agitating the waste materials to maintain them in a slurry or homogeneous condition and removing quantities of such material for further treatment or disposal. After containment, of course, the waste materials can be concentrated to remove liquid and to increase the solids content, can be treated by injecting chemical or biological treating agents, or for that matter, can be held for a time sufficient to permit accompanying waste treatment facilities to reach normal, rather than overload, operating conditions.

It should be understood that the embodiments disclosed herein are merely illustrative of the claimed invention and can be modified, altered or changed without in any way departing from the spirit and scope of the claimed invention.

I claim:

1. A waste containment means for collecting and containing waste materials comprising:
   means defining a pit area for containing liquid and solid waste materials having an inlet section adapted to receive said materials;
   cover means associated with and covering said pit area and acting in conjunction with the inlet section of said pit area to permit the entry of waste materials into said pit area and to restrain the escape of gases therefrom said cover means comprising a flexible membrane extending over the pit, in contact with the waste materials, said cover means being liquid and gas impervious;
   a layer of water overlying said cover means, said layer of water holding said cover means in contact with the waste materials thus cooling the waste materials;
   means to secure and suspend said cover means above said pit area; and
   waste material removal means associated with said pit area to remove waste materials therefrom.

2. The waste material containment means of claim 1 in which said pit area is lined with a synthetic membrane, said membrane being liquid impervious and resistant to soil and livestock waste material micro-organisms.

3. The waste material containment means of claim 2 in which said synthetic membrane is a thermoplastic.

4. The waste material containment means of claim 2 wherein said synthetic membrane is polyvinyl chloride and the thickness of said membrane is in the range of about 10 to 30 mils.

5. The waste material containment means of claim 1 wherein said cover means has a leading outer edge portion corresponding to the inlet section of said pit area, being suspended above the inlet section of said pit area and acting in conjunction with said inlet section to permit the entry of waste materials into said pit area and to restrain the escape of gases from said pit area.

6. The waste material containment means of claim 5 wherein the leading outer edge portion of said cover means is suspended above the inlet section of said pit area by suspension means extending across said inlet section, and wherein said leading outer edge of said cover means terminates and rests against the surface of said inlet section.

7. The waste material containment means of claim 6 wherein said leading outer edge of said cover means terminates in a sealed loop adjacent said inlet section, and wherein weighting means are disposed within said loop to hold the leading outer edge of said cover means in contact with the inlet section of said pit area.

8. The waste material containment means of claim 6 wherein said suspension means is a cable secured at opposite ends of said inlet section.

9. The waste material containment means of claim 1 wherein said cover means has associated therewith, floatation means to permit said cover means to float on said waste material contained in said pit area.

10. The waste material containment means of claim 9 wherein said floatation means are a plurality of buoyant pillows secured to said cover means.

11. The waste material containment means of claim 1 wherein said cover means is a fiber reinforced thermoplastic.

12. The waste material containment means of claim 1 which is further characterized by having means for agitating said waste materials associated with said pit area.

13. A waste containment means for collecting and containing waste materials comprising:

means defining a sloped-walled pit area for containing liquid and solid waste materials, said pit area being lined with a liquid impervious liner means and having an inlet section adapted to receive said materials;

liquid and gas impervious cover means associated with and covering said pit area and acting in conjunction with the inlet section of said pit area to permit the entry of waste materials and to restrain the escape of gases from said pit area, a portion of said cover means corresponding to and being suspended above said inlet section;

a layer of water overlying said cover means, said layer of water holding said cover means in contact with the waste materials thus cooling the waste materials;

means to secure said cover means above said pit area and to secure liner means within said pit area; and waste material agitation and removal means associated with said pit area means to agitate and remove waste materials from said pit area means.

14. The waste material containment means of claim 13 wherein said means to secure said cover means and said liner means is an anchor trench disposed around the perimeter of said pit area means.

15. The waste material containment means of claim 13 wherein the portion of said cover means corresponding to and suspending above said inlet section is supported by a suspension cable disposed along the length of said inlet section, said portion of said cover means engaging the surface of said inner section to form a movable trap means therewith.

16. The waste material containment means of claim 13 wherein said cover means has associated therewith, floatation means to permit said cover means to float on said waste material contained in said pit area.

* * * * *